United States Patent
Iiduka et al.

(10) Patent No.: US 7,050,673 B2
(45) Date of Patent: May 23, 2006

(54) TEMPERATURE CONTROL DEVICE AND ARRAYED WAVEGUIDE GRATING OPTICAL WAVELENGTH MULTIPLEXER/DEMULTIPLEXER

(75) Inventors: Kazuo Iiduka, Yokohama (JP); Toshiyuki Watanabe, Yokohama (JP); Noriyuki Ikuta, Yokohama (JP); Hisanobu Tanigawa, Sibuya-ku (JP); Takatsuga Yuasa, Sibuya-ku (JP)

(73) Assignees: Sumiden Opcom, Ltd., Tokyo (JP); NTT Electronics Corporation, Tokyo (JP)

( * ) Notice: Subject to any disclaimer, the term of this patent is extended or adjusted under 35 U.S.C. 154(b) by 51 days.

(21) Appl. No.: 10/485,627

(22) PCT Filed: Apr. 1, 2003

(86) PCT No.: PCT/JP03/04185

§ 371 (c)(1),
(2), (4) Date: Feb. 2, 2004

(87) PCT Pub. No.: WO03/083537

PCT Pub. Date: Oct. 9, 2003

(65) Prior Publication Data

US 2004/0202421 A1    Oct. 14, 2004

(30) Foreign Application Priority Data

Apr. 2, 2002 (JP) .............................. 2002-099605

(51) Int. Cl.
*G02B 6/34* (2006.01)
(52) U.S. Cl. .......................................... 385/37; 385/14
(58) Field of Classification Search ................ 385/31, 385/37, 14, 129
See application file for complete search history.

(56) References Cited

U.S. PATENT DOCUMENTS 6,498,878 B1 * 12/2002 Ueda ............................ 385/37
2004/0067019 A1 * 4/2004 Yoneda ......................... 385/37

FOREIGN PATENT DOCUMENTS

| JP | 09179078 A | * | 7/1997 |
| JP | 2000155227 A | * | 6/2000 |
| WO | WO 9824695 A2 | * | 6/1998 |

* cited by examiner

*Primary Examiner*—Sung Pak
(74) *Attorney, Agent, or Firm*—Oliff & Berridge, PLC

(57) ABSTRACT

In a temperature control device which maintains an object to be controlled at a preset constant temperature and an arrayed waveguide grating optical wavelength multiplexer/demultiplexer, the adverse effect of the junction temperature of the semiconductor control element is eliminated for the purpose of simplifying the overall structure and improving operation efficiency. The object to be controlled and semiconductor control element are fixed on the soaking plate. A negative feedback control is applied to the conduction condition of the semiconductor control element. Consequently, the junction temperature of the semiconductor control element is effectively used as a heating source not as a loss, thereby reducing the power consumption and stabilizing the performance.

4 Claims, 5 Drawing Sheets

TEMPERATURE CONTROL DEVICE AND ARRAYED WAVEGUIDE GRATING OPTICAL WAVELENGTH MULTIPLEXER/DEMULTIPLEXER

TECHNICAL FIELD

The present invention relates to a temperature control device which maintains an object to be controlled such as an arrayed waveguide grating optical wavelength multiplexing/demultiplexing element at a preset constant temperature with high precision, and also relates to an arrayed waveguide grating optical wavelength multiplexer/demultiplexer using this temperature control device.

BACKGROUND ART

The conventional structure of temperature control devices for maintaining an object to be controlled, such as an arrayed waveguide grating optical wavelength multiplexing/demultiplexing element at a preset constant temperature are generally composed of a soaking part 1 and a control part 6 as shown in FIG. 4 and FIG. 5.

The soaking part 1 includes a soaking plate 2 which is made from a good heat conductive material, a heater 40 which is embedded in the soaking plate 2, an object 10 to be controlled which is fixed on the soaking plate 2, and a temperature sensor 5 which is also fixed on the soaking plate 2 in such a manner as to be adjacent to the object 10 to be controlled.

The control part 6 makes a present temperature signal s2 which has been outputted from a temperature detection circuit 7 in accordance with a temperature detection signal s4 which has been transmitted from the temperature sensor 5 be compared with a target temperature signal s1 which has been outputted from a temperature setting circuit 8 that presets a heating target temperature by a comparator 9 or a control terminal circuit of a semiconductor control element 30 connected in series with the heater 40. Then, an error signal s3 which indicates the comparison result of the comparator 9 is inputted as a control signal to the control terminal of the semiconductor control element 30.

Thus, the conventional structure is based on a negative feedback control where the heater 40 is the only heat source, the temperature information from the temperature sensor 5 that is thermally coupled to the heater 40 is processed in the control part 6, and the current to be supplied to the heater 40 is controlled by the semiconductor control element 30 of the control part 6, thereby driving the heater 40 and maintaining the soaking plate 2 and the object 10 to be controlled at a constant temperature (See the description of the prior art in Japanese Unexamined Patent Application No. 9-306638, for example).

However, in the aforementioned prior art device, the semiconductor control element 30, which directly controls the current to be supplied to the heater 40, inevitably generates a high junction temperature. The heat generation demands that the semiconductor control element 30 includes a component for efficiently radiating its junction temperature. This causes the problem of making the structure of the control part 6 of the temperature control device complex, and as another problem the miniaturization of the arrayed waveguide grating optical wavelength multiplexer/demultiplexer using this temperature control device is substantially limited.

As a further additional problem, part of the electric power from the power supply to drive the heater 40 is wasted as the junction temperature of the semiconductor control element 30 and this loss in the semiconductor control element 30 becomes ineffective, thereby deteriorating the efficiency of the overall temperature control device.

The heat resistance value (temperature rise per 1 W) of the semiconductor control element 30 corresponds to the junction temperature, the case temperature of the arrayed waveguide grating optical wavelength multiplexer/demultiplexer and the atmospheric temperature. Between the case temperature and the atmospheric temperature, the heat resistance value corresponds to a heat sink (radiating means). As a further additional problem, the heat resistance value will be raised by the miniaturization of the temperature control device, whereby it becomes impossible to further improve the reliability of the temperature control device.

The present invention, which has been contrived to solve the aforementioned problems in the prior art device, has the technical challenge of eliminating the adverse effect of the junction temperature of the semiconductor control element in a temperature control device which maintains an object to be controlled at a preset constant temperature and in an arrayed waveguide grating optical wavelength multiplexer/demultiplexer using this temperature control device. And the present invention has the object of simplifying the structure of each of the temperature control device and the arrayed waveguide grating optical wavelength multiplexer/demultiplexer, and of improving operation efficiency sufficiently without any trouble.

DISCLOSURE OF THE INVENTION

According to the present invention which solves the aforementioned technical problems, the invention described in claim 1 is characterized in that: the temperature control device maintains an object to be controlled such as an arrayed waveguide grating optical wavelength multiplexing/demultiplexing element at a preset constant temperature;

this temperature control device comprises a soaking part and a control part;

the soaking part includes: a soaking plate which is made from a good heat conductive material such as a metal, and which heats the object to be controlled that is firmly fixed on the top surface thereof; a semiconductor control element with a control terminal which is firmly fixed on a site at the bottom surface of the soaking plate that is opposite the object to be controlled and which functions as a heat generator; and a temperature sensor which is fixed on the soaking plate in such a manner as to be adjacent to the object to be controlled;

the control part includes: a temperature setting circuit which sets a heating target temperature; a temperature detection circuit which detects a present temperature in accordance with a temperature detection signal s4 transmitted from the temperature sensor of the soaking part; and a comparator which is a control terminal circuit of the semiconductor control element and which compares a target temperature signal s1 transmitted from the temperature setting circuit with a present temperature signal s2 transmitted from the temperature detection circuit and outputs the difference as an error signal s3.

In various exemplary embodiments in the soaking part, electric power is supplied to the semiconductor control element to cause heat generation, whereby the soaking plate is heated and then the object to be controlled is heated. The temperature to heat up the object to be controlled is constantly measured by the temperature sensor, and the measurement result is transmitted as a measurement signal s4 to the control part.

In the control part, the temperature detection signal s4 is inputted to the temperature detection circuit to generate a present temperature signal s2 which is compared by the comparator with a target temperature signal s1 which has been generated in the temperature setting circuit in accordance with the preset heating target temperature, and the difference between these signals is inputted as an error signal s3 to the control terminal of the semiconductor control element.

The semiconductor control element with the control terminal controls power consumption in accordance with the error signal s3, so the smaller the error signal s3, that is, the smaller the difference between the value of the target temperature signal s1 and the value of the present temperature signal s2, the smaller the power consumption. The object to be controlled is heated up to the target temperature and kept at the target constant temperature.

Since the semiconductor control element which directly controls the electric power for heat generation of the soaking part is used as the heat source of the soaking part, the soaking plate functions as the radiator plate of the semiconductor control element, making it unnecessary to provide the semiconductor control element with a radiating component of its own use.

The semiconductor control element controls electric power required for heat generation of its own, resulting in directly controlling all the electric power required for heat generation of the soaking part. This enables the soaking part to obtain efficient heating action and the electric power to have a low voltage because the semiconductor control element is the only load of the electric power required for heating.

The semiconductor control element can set its junction temperature lower than the temperature at the time of controlling the current to be supplied to the conventional heater and nearly the same as the preset temperature of the soaking part. This setting can prevent influence of the ambient temperature, thereby improving the reliability.

In other words, the failure rate (the number of FIT) of the semiconductor control element depends on the junction temperature, which can be set low so as to make the semiconductor control element more reliable.

Because the heat resistance value of the semiconductor control element corresponds to the junction temperature and the case temperature, the heat resistance value becomes equal between the case temperature and the atmospheric temperature. This is equivalent to the condition where a radiator of infinite size is installed, thereby decreasing the junction temperature and improving the reliability.

The control part, which is not provided with a heat-generating semiconductor control element, does not have to include a radiation means or a thermal protection means. This can reduce the size and weight of the device and simplify the structure, thereby facilitating usability and greatly reducing the restraints regarding installation.

In various exemplary embodiments, the semiconductor control element is a transistor.

In various exemplary embodiments, as the power supply of this kind of temperature control device, it is common to use a DC constant-voltage power supply. Therefore, electric current control is suitable as the control of heat generation, that is, the control of electric power to be supplied. Thus, a transistor capable of obtaining a high current gain can be used as the semiconductor control element to achieve efficient temperature control.

Various exemplary embodiments are characterized in that: an arrayed waveguide grating optical wavelength multiplexer/demultiplexer comprises: an object to be controlled which is an arrayed waveguide grating optical wavelength multiplexing/demultiplexing element; and a temperature control device which maintains the object to be controlled at a preset constant temperature;

the temperature control device is composed of a soaking part and a control part;

the soaking part of the temperature control device includes: a soaking plate which is made from a good heat conductive material such as a metal and which heats the object to be controlled that is firmly fixed on the top surface thereof; a semiconductor control element with a control terminal which is firmly fixed on a site on the bottom surface of the soaking plate that is opposite the object to be controlled and which functions as a heat generator; and a temperature sensor which is fixed on the soaking plate in such a manner as to be adjacent to the object to be controlled;

the control part of the temperature control device includes: a temperature setting circuit which sets a heating target temperature; a temperature detection circuit which detects a present temperature in accordance with a temperature detection signal s4 transmitted from the temperature sensor of the soaking part; and a comparator which is a control terminal circuit of the semiconductor control element and which compares a target temperature signal s1 transmitted from the temperature setting circuit with a present temperature signal s2 transmitted from a temperature measurement circuit and outputs the difference as an error signal s3.

In various exemplary embodiments, the temperature control device accurately and stably performs the heating temperature control for the object to be controlled without being affected by the ambient temperature, whereby the wavelength of the output wave in each output waveguide can be kept accurately to the set value.

Since the power consumption of the temperature control device can be lessened, the power consumption in the overall arrayed waveguide grating optical wavelength multiplexer/demultiplexer can also be reduced.

The lowered voltage of the power supply of the temperature control device and the heightened reliability of the semiconductor control element provide the temperature control device with a longer life.

The simplified and miniaturized structure of the temperature control device leads to easy downsizing of the overall structure of the arrayed waveguide grating optical wavelength multiplexer/demultiplexer, resulting in easier handling and installation of the device.

BEST MODE FOR CARRYING OUT THE INVENTION

The examples of the arrayed waveguide grating optical wavelength multiplexer/demultiplexer of the present invention will be described as follows, with reference to the drawings.

Figure 1:
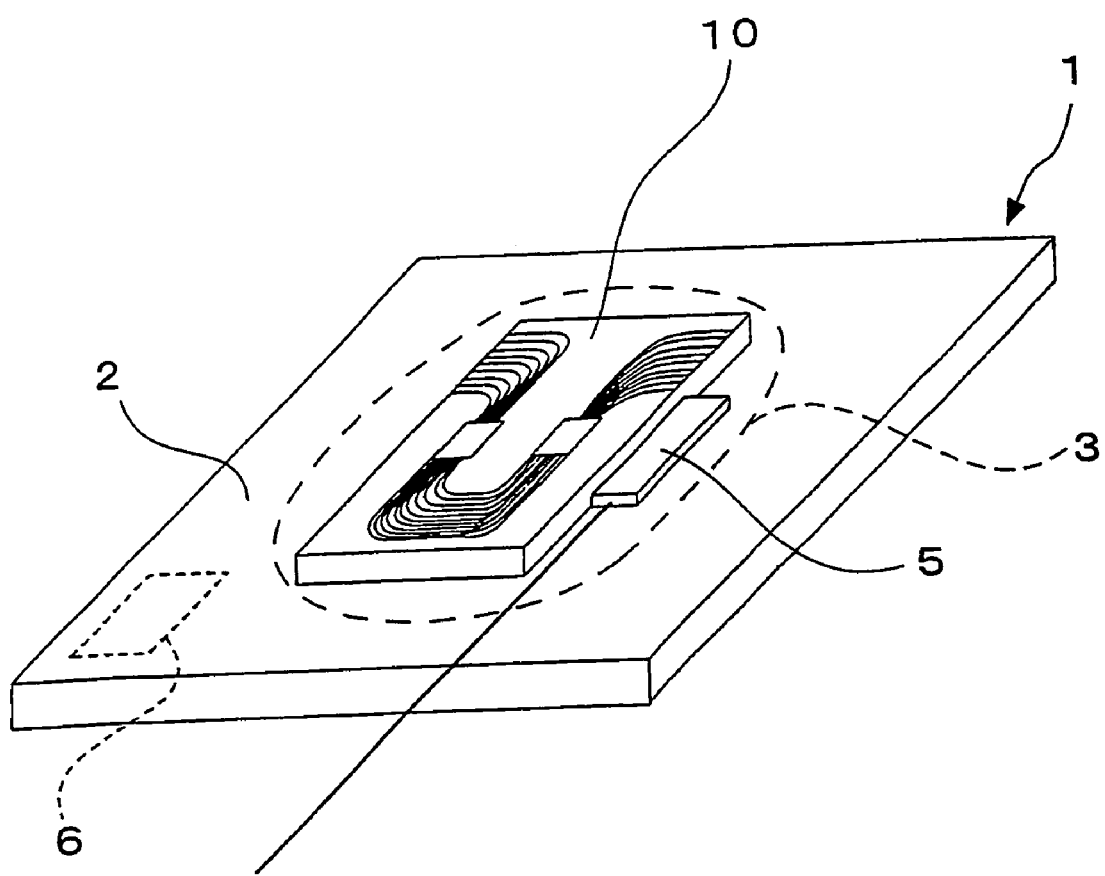
FIG. 1 is an overall external perspective view of the example of the present invention.
Figure 2:
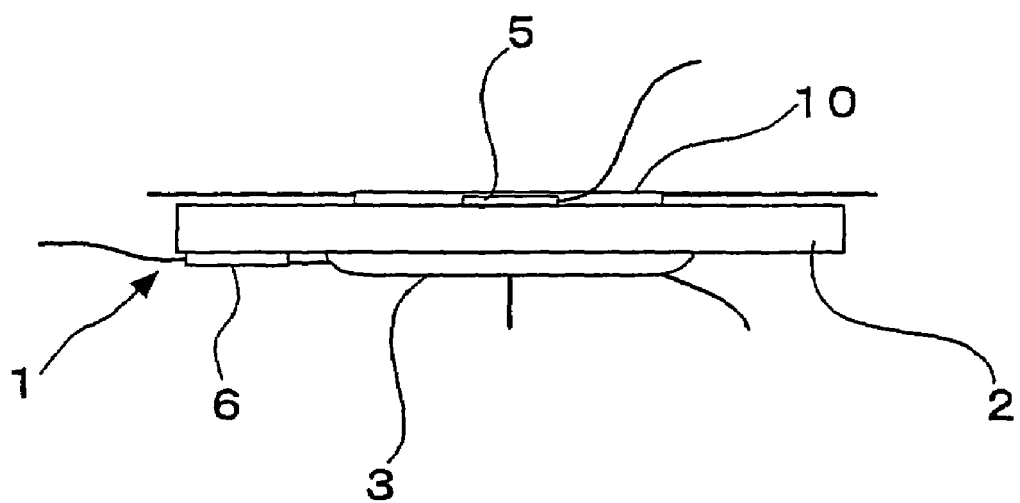
FIG. 2 is a side view of the example shown in FIG. 1.
Figure 3:
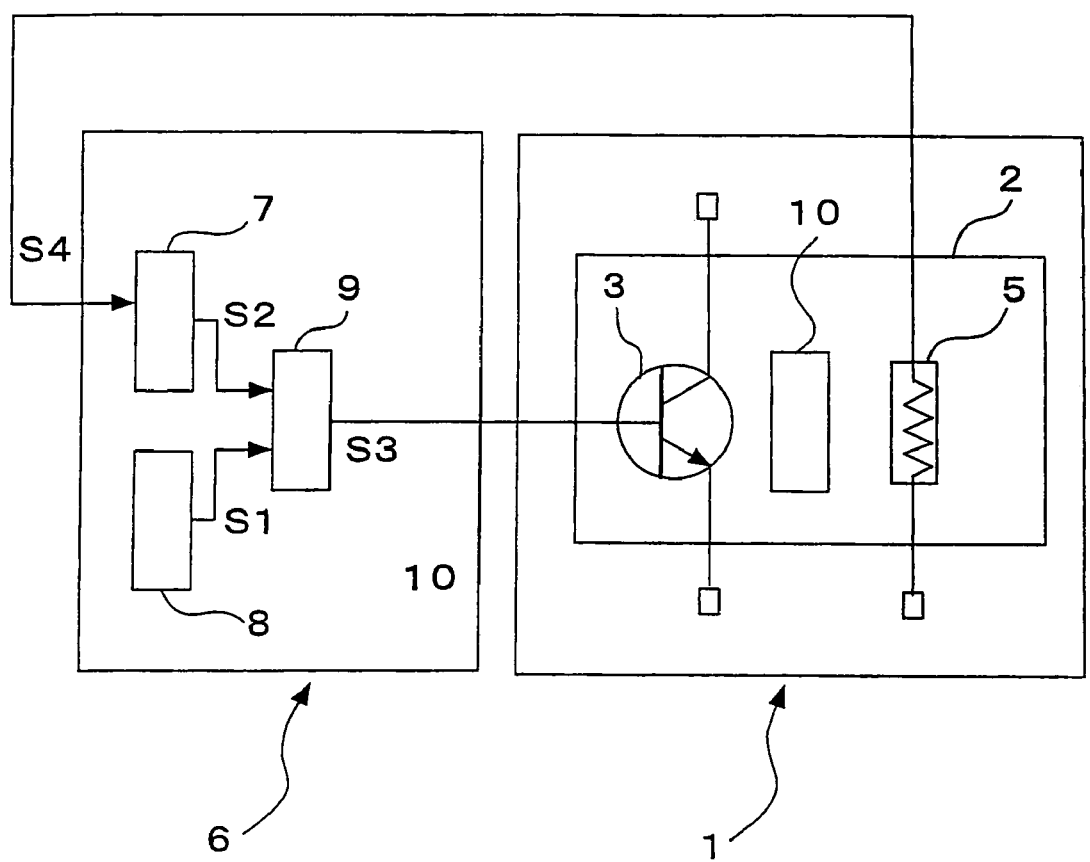
FIG. 3 is a block diagram showing the circuit configuration of the example shown in FIG. 1.
Figure 4:
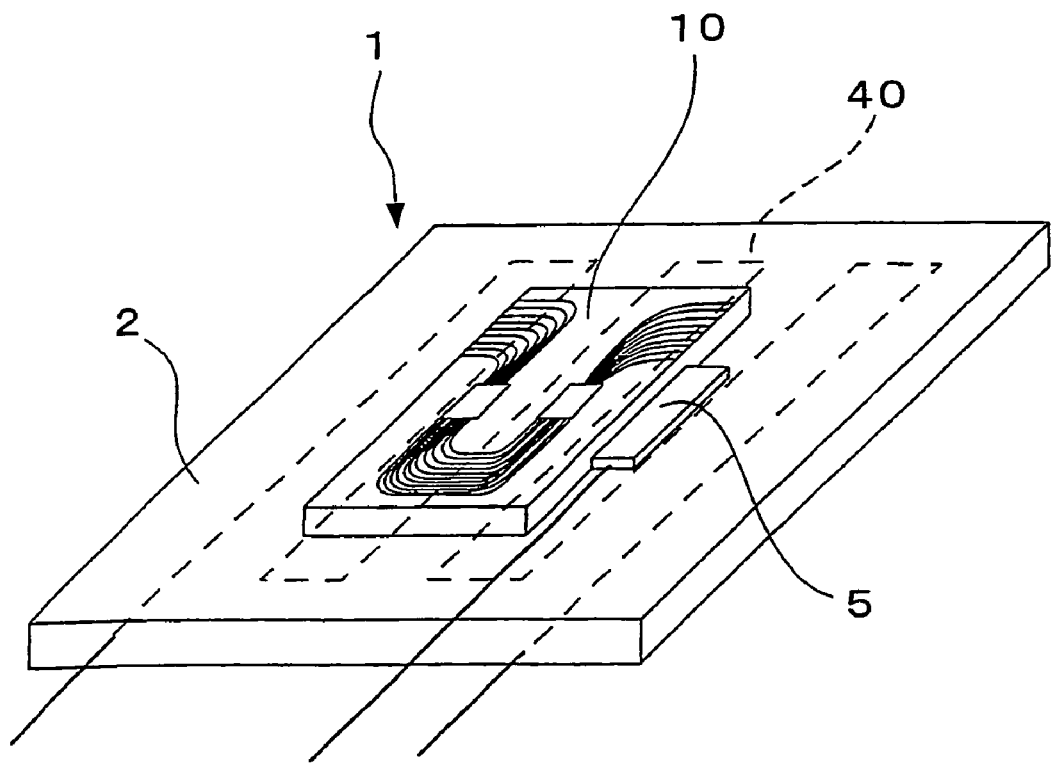
FIG. 4 is an external perspective view showing the structure of the prior art device.
Figure 5:
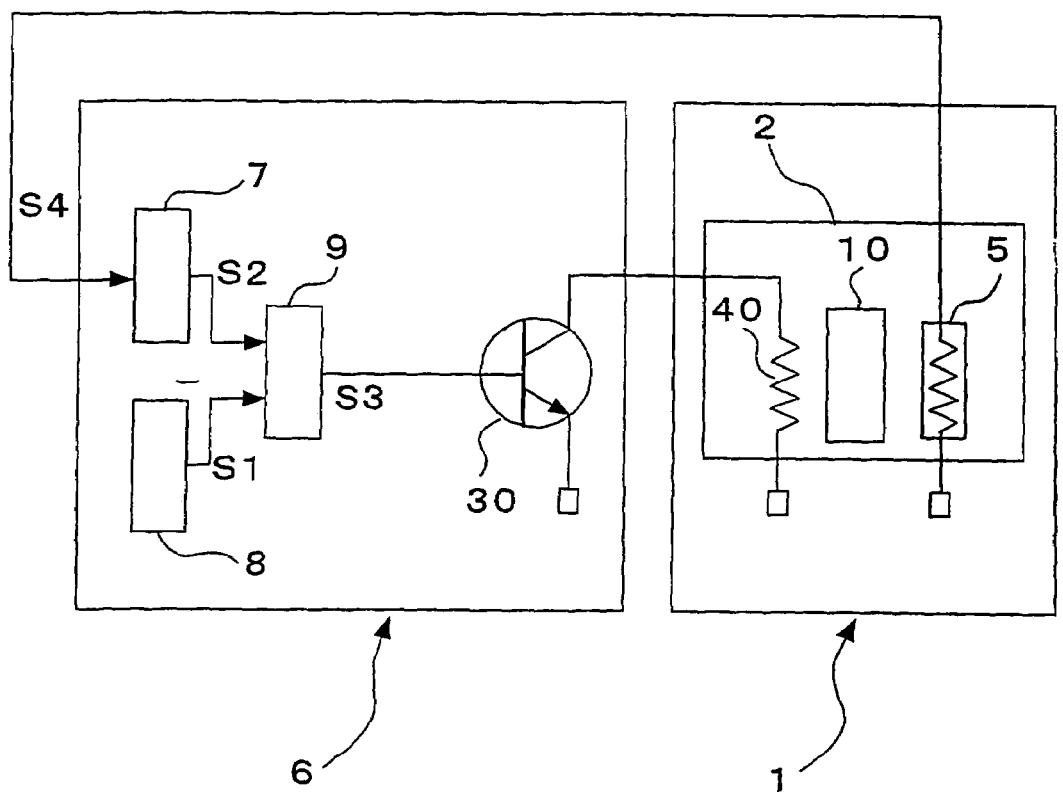
FIG. 5 is a block diagram showing the circuit configuration of the prior art device shown in FIG. 4.

FIG. 1 to FIG. 3 show the example of the invention. As shown in FIG. 1 and FIG. 2, the soaking part 1 of the temperature control device T includes a soaking plate 2 which is made from a good heat conductive material such as a metal like aluminum or copper or a sintered metal (ceramic) and which is shaped into a flat plate; and an object 10 to be controlled which is an arrayed waveguide grating optical wavelength multiplexing/demultiplexing element that must be kept at a constant temperature because its characteristics change with temperature. The object 10 to be controlled is fixed on the top surface of soaking plate 2 in such a manner as to have as large a contact area as possible, and a temperature sensor 5 is fixed on the top surface of soaking plate 2 so as to be adjacent to the object 10 to be controlled. In addition, a transistor (power transistor) which is a semiconductor control element 3 with a control terminal is firmly fixed on a site (See FIG. 2) at the bottom surface of the soaking plate 2 that is opposite the object 10 to be controlled, and an integrated circuited control part 6 is also fixed on the bottom surface of the soaking plate 2.

The control part 6 of the temperature control device T includes a temperature detection circuit 7 which inputs a temperature detection signal s4 that is a temperature signal transmitted from the temperature sensor 5 and outputs a present temperature signal s2 that has the size corresponding to the temperature detection signal s4; a temperature setting circuit 8 which previously sets a constant temperature value at which to maintain the object 10 to be controlled and which outputs a target temperature signal s1 having the constant size in accordance with this constant temperature value; and a comparator 9 which inputs the target temperature signal s1 and the present temperature signal s2 concurrently and outputs the difference between these signals as an error signal s3, and which also functions as the control terminal circuit of the semiconductor control element 3.

Thus, the control part 6, which substantially composes the control terminal circuit of the semiconductor control element 3 as a whole, can be operated with small electric power and therefore very easily IC-compatible a whole.

Since the semiconductor control element 3 is fixed as a heating source on the soaking plate 2, the soaking plate 2 functions to radiate the semiconductor control element 3. Consequently, the semiconductor control element 3 does not have a radiating component of its own.

EFFECTS OF THE INVENTION

The present invention with the aforementioned structure offers the following effects.

In various exemplary embodiments, the junction temperature of the semiconductor control element which controls the electric power for heat generation of the soaking part is used as the heat source of the soaking part. This structure enables electric power as the heat source to have a small load so as to decrease the power consumption, thereby realizing a low voltage. As a result, the soaking part can perform efficient heating operation.

Furthermore, since the soaking plate functions to radiate the semiconductor control element, the structure of the semiconductor control element is simplified. In addition, the target temperature demanded of the soaking part is much smaller than the junction temperature of the prior art semiconductor control element, so the semiconductor control device can be operated with a low junction temperature. This structure improves the reliability of the semiconductor control element and realizes safe and stable operations.

Since the control part does not include any component which generates as much heat as must be radiated, it is easy to reduce its overall size and weight sufficiently. This structure enables the control part to be handled easily, and the restraints regarding its installing location are almost eliminated. In some cases, the control part can be integrated with the soaking part, thereby becoming More easily IC-compatible.

In various exemplary embodiments, in the temperature control device using a DC constant-voltage power supply, the control of current can achieve the control of heat generation in the state of obtaining a high current gain, thereby offering an efficient and stable temperature control.

In various exemplary embodiments, the wavelength of the output wave in each output waveguide can be accurately kept at the set value, which enables accurate demultiplexing characteristics to be kept in a stable manner, and high safety to be obtained from low power consumption.

The invention claimed is:

1. A temperature control device for maintaining an object to be controlled at a preset constant temperature, said temperature control device comprising: a soaking part; and a control part, said soaking part including: a soaking plate which is made from a good heat conductive material and which heats said object to be controlled that is directly fixed on the top surface thereof; a semiconductor heating target temperature generating control element with a control terminal which is firmly fixed on a site at the bottom surface of the soaking plate that is opposite the object to be controlled and which functions as a heat generator for heating the soaking plate to a heating target temperature; and a temperature sensor which is fixed on said soaking plate adjacent to said object to be controlled, and said control part including: a temperature setting circuit which sets the heating target temperature; a temperature detection circuit which detects a present temperature in accordance with a temperature detection signal transmitted from said temperature sensor; and a comparator which is a control terminal circuit of said semiconductor control element and which compares a target temperature signal transmitted from said temperature setting circuit with a present temperature signal transmitted from said temperature detection circuit and outputs the difference as an error signal.

2. The temperature control device of claim 1, wherein said semiconductor control element is a transistor.

3. An arrayed waveguide grating optical wavelength multiplexer/demultiplexer comprising: an object to be controlled which is an arrayed waveguide grating optical wavelength multiplexing/demultiplexing element; and a temperature control device which maintains the object to be controlled at a preset constant temperature, said temperature control device being composed of a soaking part and a control part, said soaking part including: a soaking plate which is made from a good heat conductive material and which heats said object to be controlled that is directly fixed on the top surface thereof; a semiconductor heating target temperature generating control element with a control terminal which is firmly fixed on a site at the bottom surface of the soaking plate that is opposite the object to be controlled and which functions as a heat generator for heating the soaking plate to a heating target temperature; and a temperature sensor which is fixed on said soaking plate adjacent to said object to be controlled, and said control part including: a temperature setting circuit which sets the heating target temperature; a temperature detection circuit which detects a present temperature in accordance with a temperature detection signal transmitted from said temperature sensor; and a comparator which is a control terminal circuit of said semiconductor control element and which compares a target temperature signal transmitted from said temperature setting circuit with a present temperature signal transmitted from said temperature detection circuit and outputs the difference as an error signal.

4. The temperature control device of claim 1, wherein the object to be controlled is an arrayed waveguide grating optical wavelength multiplexing/demultiplexing element.

* * * * *